Nov. 16, 1926.
P. J. INGLE
1,606,839
CULTIVATOR
Filed Nov. 11, 1925   3 Sheets-Sheet 1
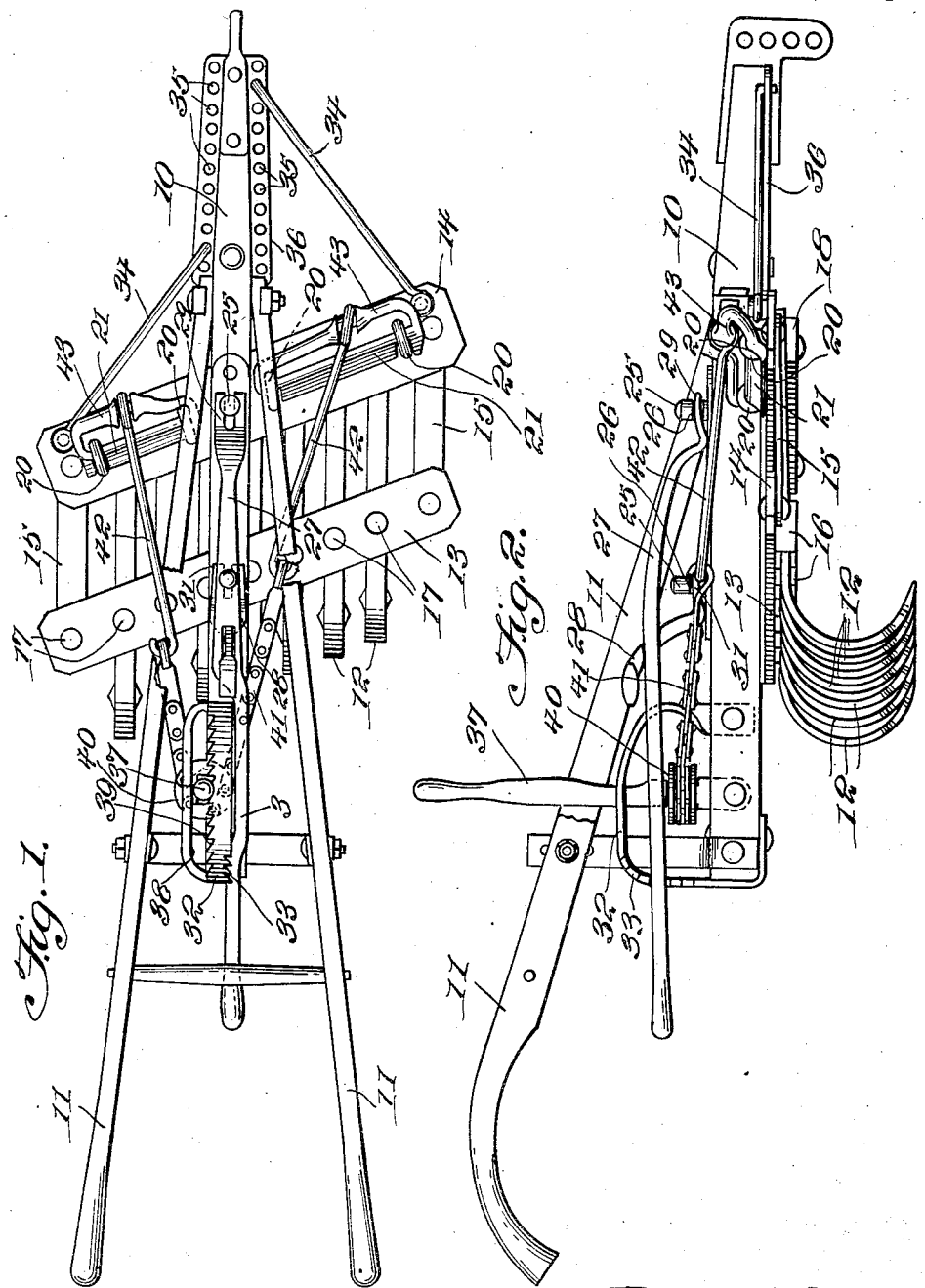
Peter J. Ingle
INVENTOR
BY Victor J. Evans
ATTORNEY
WITNESS: J. T. L. Wright

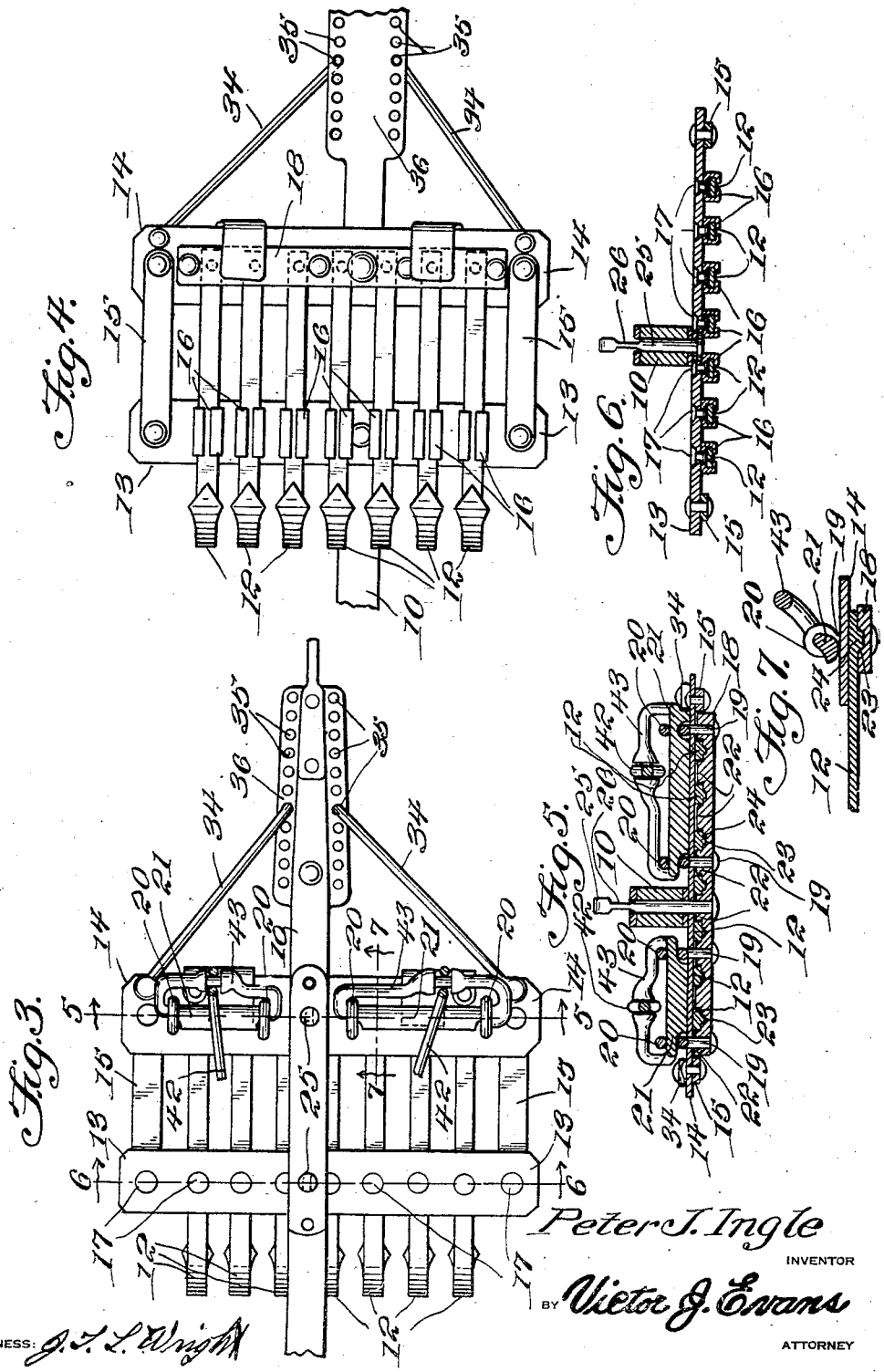

Nov. 16, 1926.
P. J. INGLE
CULTIVATOR
Filed Nov. 11, 1925   3 Sheets—Sheet 3
1,606,839
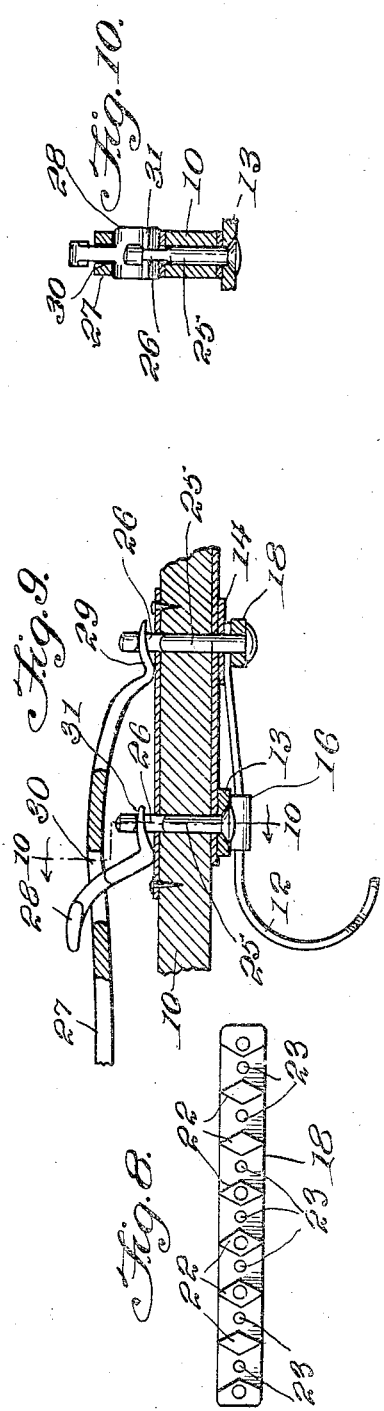
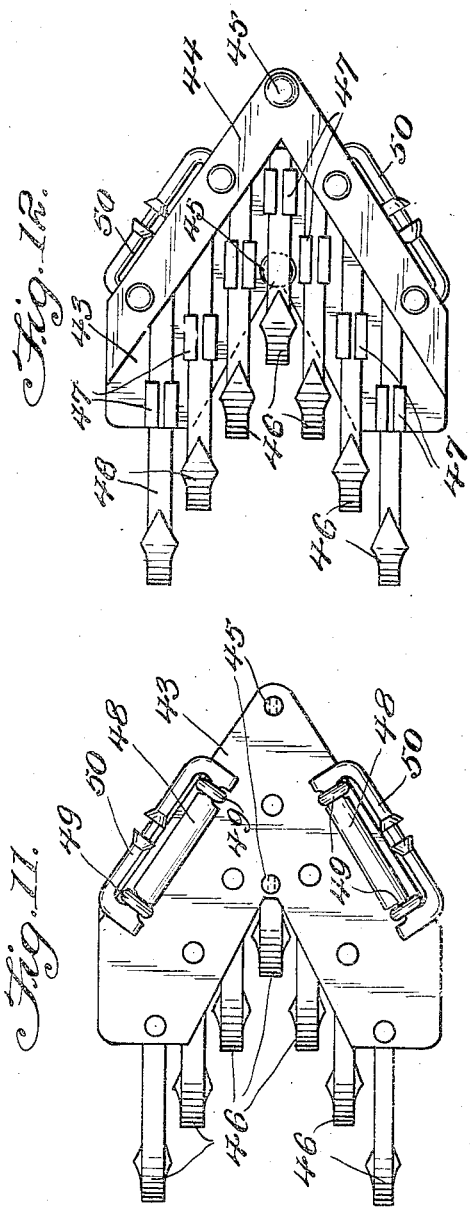
Peter J. Ingle
INVENTOR
BY Victor J. Evans
ATTORNEY
WITNESS: J. S. L. Wright Patented Nov. 16, 1926.

1,606,839

UNITED STATES PATENT OFFICE.

PETER J. INGLE, OF HACKLEBURG, ALABAMA.

CULTIVATOR.

Application filed November 11, 1925. Serial No. 68,392.

This invention relates to cultivators and contemplates a structure wherein the teeth are supported by a frame capable of being adjusted with relation to the cultivator beam for the purpose of arranging the teeth in different relative positions, means being provided for holding the frame fixed with relation to the beam in its adjusted position.

In carrying out the invention I also comprehend a novel construction of means for holding the said frame attached to the cultivator beam in the manner whereby said frame can be quickly and conveniently attached to or removed from said beam.

Another object of the invention resides in constructing the said frame to permit any one or more of the teeth to be quickly and easily replaced should the occasion require, and means for holding the teeth against casual separation from the frame.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:—

Figure 1 is a top plan view of the cultivator.

Figure 2 is a side elevation.

Figure 3 is an enlarged fragmentary plan view.

Figure 4 is a similar bottom plan view.

Figure 5 is a sectional view taken on line 5—5 of Figure 3.

Figure 6 is a sectional view taken on line 6—6 of Figure 3.

Figure 7 is a sectional view taken on line 7—7 of Figure 3.

Figure 8 is a plan view of one part of the teeth supporting frame.

Figure 9 is an enlarged fragmentary sectional view, showing how the frame is held attached to the cultivator beam.

Figure 10 is a sectional view on line 10—10 of Figure 9.

Figure 11 is a top plan view of a modified construction.

Figure 12 is a bottom plan view of Figure 11.

Referring to the drawings in detail, 10 indicates the cultivator beam to which is secured handles 11 in the ordinary well known manner. The teeth 12 are associated with a frame adapted to be detachably supported upon the beam 10 and capable of adjustment to change the relative position of the teeth as shown in Figures 1 and 2.

This frame includes spaced parallel plates 13 and 14 respectively which are connected by end bars 15, thereby defining a parallelogram. The ends bars are pivotally connected with the adjacent plates 13 and 14, while the latter are supported upon the beam 10 for pivotal movement. Each tooth 12 is slidably received by a channel shaped guide and holder 16 carried by the underside of the plate 13, each element 16 being supported for pivotal movement by a pin 17 pivoted on the plate 13. The corresponding forward extremities of the teeth 12 are clamped between the plate 14 and a parallel bar 18 which is secured to the plate 14 for movement toward and away from the latter. In other words this transverse bar is supported by spaced eye bolts 19 which slide through openings in the plate 14, the eyes 20 of said bolts receiving cam shaped bars 21 as clearly shown in Figure 5. These cams 21 are connected with an operating lever in the manner to be hereinafter described so that the plate 14 and transverse bar 18 can be conveniently adjusted to clamp the teeth therebetween, or separated a sufficient distance to allow any one or more teeth to be removed from the frame as the occasion may require. It will be noted that upon inspection of Figure 8 one side of the transverse bar 18 is formed with spaced diamond shaped projections 22 between which the teeth are arranged, this construction allowing the frame to be shifted to different angular positions with relation to the cultivator beam 10 as shown in Figures 1 and 2. Again, this bar 18 is formed with depressions 23 between the projections 22, each depression receiving a projection 24 carried by the adjacent tooth 12 which prevents casual separation of the same from the frame incident to the use of the cultivator.

The frame in its entirety is supported on the cultivator beam 10 by pivot pins 25 as clearly shown in Figure 9, there being two of these pins, each being notched as at 26. These pins are passed through openings in the frame and through alined openings in the beam 10, above which the pins are engaged by levers 27 and 28 respectively to hold the parts associated and at the same time permit the frame to be adjusted in the manner above described. The lever 27 is comparatively long being arranged above the beam 10 and having a bifurcated extremity 29, the separated portions of which are adapted to be received by the notches in the adjacent pin 25. This lever is slotted at an appropriate point in its length to receive a comparatively short lever 28 which also has a bifurcated extremity 31, the separated portions of which are received by the notches 26 of the adjacent pin 25. When the parts are arranged in the manner illustrated in Figure 9, wherein it will be noted that the lever 27 is in its active position, the frame supporting the teeth 12 is held attached to the beam 10. Supported by the beam 10 is an inverted U-shaped bracket 32 having notches 33 which are adapted to receive the adjacent portion of the lever 27 to hold it in its lowered active position. This lever 27 need only be elevated in order to separate the same, as well as the lever 28 from the pins 25, whereupon the frame supporting the teeth can be quickly separated from the beam 10. To assist in holding the teeth carrying frame in an adjusted position with relation to the beam 10, I employ a pair of rods 34 which have their corresponding extremities pivotally connected with the plate 14 of the frame, and their other extremities offset to be interchangeably received by openings 35 arranged along the opposed longitudinal edges of a plate 36 secured to the beam 10 as clearly shown, in Figures 3 and 4.

The means for clamping the teeth 12 between the plate 14 and the transverse bar 18 is controlled by a lever 37 pivoted upon the beam 10 and arranged to operate in a slot 38 formed in the inverted U-shaped bracket 32. One edge of the slot 38 is formed with notches 39 with which the lever 37 cooperates, whereby the latter is held immovable in its active position. Rotatably supported upon this lever is a pulley 40 about which is trained a chain or other suitable flexible element 41, and the free ends of this chain are connected to rods 42 which in turn are connected to yokes 43 carried by the cam shaped bars 21, and preferably forming an integral part thereof. Consequently when the lever 37 is moved rearwardly, a pull is exerted upon the yokes 43, thereby turning the cam shaped bars 21 against the plate 14, incidentally moving the transverse bar 18 into gripping relation with the plate 14, because of the association of the cam shaped bars 21 with the eye bolts 19 above described. The lever 37 is then engaged with the bracket 32 and held in its given position. Now, when it is desired to separate one or more teeth from the frame, it is only necessary to move the lever 37 in a forward direction, thus releasing the tension on the transverse bar 18, so that the latter can be slightly separated from the plate 14 for this purpose. Again, when it is desired to shift the frame into an angular position with relation to the beam 10 the lever 37 is also moved to its inactive position to release the tension on the chain 41, and after separating the rods 34 from the plate 36 the frame can be swung upon its pivots. During this movement of the frame the chain 41 travels around the pulley 40, and after the frame has been properly adjusted the rods 34 are again associated with the plate 36.

In Figures 11 and 12 I have shown a modified construction of the teeth carrying frame which differs from the preferred form in the contour of the frame. In other words the frame in this form of the invention includes upper and lower members 43 and 44 respectively which as shown in said figures are V-shaped in plan. This frame is provided with the pivot bolts 45 to permit the frame to be associated with the beam 10 in the same manner as herein above described, while each tooth 46 is also adapted to be clamped between these plates as shown. Again, each tooth is received by a channel shaped guide or holder 47 secured to the underside of the plate 43, while the teeth vary in length as distinguished from the preferred form of the invention. The cam shaped bars for clamping the teeth in position are indicated at 48 and pass through eye bolts 49 in the same manner as described with the preferred form of the invention. Each cam bar 48 is provided with a yoke 50 adapted to be connected with the lever 37 above referred to.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What is claimed is:—

1. A cultivator comprising a beam, a frame, means including a lever for detachably connecting the frame to the beam, and permitting said frame pivotal movement in a horizontal plane, teeth separately associated with said frame, and means for attaching the teeth to the frame in a manner whereby said teeth are shifted relatively incident to the adjustment of said frame.

2. A cultivator comprising a beam having spaced openings, a frame, pivot pins carried by the frame and adapted to be received by said openings, levers designed to engage said pins for detachably connecting the frame with said beam and also allowing the frame pivotal movement in a horizontal plane, teeth supported on said frame for pivotal movement, whereby said teeth are shifted into relatively different positions incident to the adjustment of said frame, and means for holding said frame fixed with relation to the beam in any of its given positions.

3. A cultivator comprising a beam, a frame pivotally mounted thereon for horizontal adjustment with relation to the beam, said frame including spaced members, teeth carried by the frame and adapted to be clamped between said members, means including a lever for holding said members in clamping relation, said teeth being mounted for pivotal movement whereby their positions are changed relatively incident to the adjustment of said frame, and means for holding the frame fixed to the beam in a given position.

4. A cultivator comprising a beam, a frame supported thereon for horizontal adjustment, said frame including spaced members, teeth carried by the frame and adapted to be clamped between said members, and capable of pivotal movement incident to the adjustment of said frame, eye bolts carried by one member of the frame and slidable through openings in the other member thereof, cam shaped bars passed through said eyes and mounted for rocking movement, means including a manually operable lever for moving said members of the clamp into gripping relation, and allowing said frame to be moved upon its pivots, and means for holding the frame fixed relatively to the beam in its given position.

5. A cultivator comprising a beam, a frame, means including a lever for detachably connecting the frame to the beam, and permitting said frame pivotal movement in a horizontal plane, teeth pivoted on said frame and adapted to be shifted into relatively different positions incident to the adjustment of said frame, a perforated plate supported on said beam, and rods pivoted on the frame and adapted to be associated with said plate for holding the frame fixed in a given position.

In testimony whereof I affix my signature.

PETER J. INGLE.